United States Patent
Ayukawa et al.

(10) Patent No.: US 8,149,546 B2
(45) Date of Patent: Apr. 3, 2012

(54) MAGNETIC FIELD DETECTING ELEMENT INCLUDING TRI-LAYER STACK WITH STEPPED PORTION

(75) Inventors: Toshiyuki Ayukawa, Tokyo (JP); Daisuke Miyauchi, Tokyo (JP); Koji Shimazawa, Tokyo (JP); Takahiko Machita, Tokyo (JP)

(73) Assignee: TDK Corporation, Tokyo (JP)

( * ) Notice: Subject to any disclaimer, the term of this patent is extended or adjusted under 35 U.S.C. 154(b) by 1194 days.

(21) Appl. No.: 11/925,030

(22) Filed: Oct. 26, 2007

(65) Prior Publication Data

US 2009/0109580 A1 Apr. 30, 2009

(51) Int. Cl.
*G11B 5/39* (2006.01)

(52) U.S. Cl. ........................................ 360/324; 360/315
(58) Field of Classification Search .................. 360/314, 360/315, 324, 324.12, 324.2
See application file for complete search history.

(56) References Cited

U.S. PATENT DOCUMENTS

| | | | | |
|---|---|---|---|---|
| 6,563,679 B1 * | 5/2003 | Li et al. | .......................... | 360/324 |
| 6,731,473 B2 * | 5/2004 | Li et al. | .......................... | 360/314 |
| 7,035,062 B1 * | 4/2006 | Mao et al. | .................. | 360/324.2 |
| 7,869,165 B2 * | 1/2011 | Miyauchi et al. | ............. | 360/319 |
| 7,916,429 B2 * | 3/2011 | Miyauchi et al. | ........ | 360/324.12 |
| 2002/0114111 A1 * | 8/2002 | Zhu | .............................. | 360/324.2 |
| 2005/0219773 A1 * | 10/2005 | Li et al. | .................... | 360/324.12 |

FOREIGN PATENT DOCUMENTS

| | | |
|---|---|---|
| JP | 5-12628 | 1/1993 |
| JP | 7-85406 | 3/1995 |
| JP | 2002-329905 | 11/2002 |
| JP | 2003-204096 | 7/2003 |
| JP | 2004-319060 | 11/2004 |

* cited by examiner

*Primary Examiner* — Craig A. Renner
(74) *Attorney, Agent, or Firm* — Knobbe Martens Olson & Bear LLP

(57) ABSTRACT

A magnetic field detecting element comprises a stack including upper and lower magnetic layers, and a non-magnetic intermediate layer sandwiched therebetween, wherein magnetization of the magnetic layers changes in accordance with an external magnetic field; upper and lower shield electrode layers sandwiching the stack in a direction of stacking, wherein the upper and lower shield electrode layers supply sense current in the direction of stacking, and magnetically shield the stack; a bias magnetic layer provided on a surface of the stack opposite to an air bearing surface, and wherein the bias magnetic layer applies a bias magnetic field to the upper and lower magnetic layers in a direction perpendicular to the air bearing surface; and insulating layers provided on both sides of the stack in a track width direction thereof, wherein the stack has a stepped portion formed at the non-magnetic intermediate layer.

12 Claims, 17 Drawing Sheets

MAGNETIC FIELD DETECTING ELEMENT INCLUDING TRI-LAYER STACK WITH STEPPED PORTION

BACKGROUND OF THE INVENTION

1. Field of the Invention

The present invention relates to a magnetic field detecting element, and in particular to an element structure of a magnetic field detecting element having a tri-layer stack.

2. Description of the Related Art

A thin film magnetic head used for a magnetic recording device includes a playback head having a reproducing element for read and a record head having a write element for write. As the reproducing element of the thin film magnetic head, a giant magneto resistance (GMR) element is known. Conventionally, a CIP (Current In Plane)-GMR element that makes sense current flow in a direction parallel to a film surface thereof has been mainly used. In recent years, however, an element that makes sense current flow in a direction perpendicular to a film surface thereof has been developed in order to active higher density recording. A tunnel magneto resistance (TMR) element utilizing a TMR effect, and a CPP (Current Perpendicular to the Plane) element utilizing a GMR effect are known as the element of this type. In particular, the CPP element has a lower resistance compared to the TMR element, and can provide a higher output compared to the CIP element, even if the track width is narrow. Therefore the CPP element has a high potential.

The CPP element has a stack including a magnetic layer (free layer) whose magnetization direction changes corresponding to an external magnetic field, a magnetic layer (pinned layer) whose magnetization direction is fixed, and a non-magnetic intermediate layer sandwiched between the pinned layer and the free layer. Further, the stack has an antiferromagnetic layer (pinning layer) to fix the magnetization direction of the pinned layer. The pinning layer is provided adjacent to the pinned layer, and fixes the magnetization direction of the pinned layer by exchange coupling with the pinned layer. The stack may be also called "spin-valve film". The magnetization direction of the free layer changes in accordance with an external magnetic field, and a relative angle between the magnetization direction of the free layer and the magnetization direction of the pinned layer is changed. Thus, electrical resistance of sense current that flows in a direction perpendicular to the film surface of the spin-valve film is changed. Using this property, the external magnetization is detected.

Meanwhile, in recent times, there is a desire for magnetic recording devices that have a higher recording density. In order to improve linear recording density, the layer thickness of the stack needs to be reduced. For this purpose, there has been proposed a stack having a novel layer structure different from the layer structure of the conventional spin-valve film described above. For example, U.S. Pat. No. 7,035,062, and U.S. Pat. No. 7,177,122 disclose a magnetic field detecting element having a tri-layer stack for the CPP element. The tri-layer stack disclosed in these documents includes upper and lower magnetic layers (free layers) whose magnetization directions change in accordance with an external magnetic field, and a non-magnetic intermediate layer sandwiched between the free layers. A bias magnetic layer is provided on the side of the stack opposite to an air bearing surface, and a bias magnetic field is applied in the direction perpendicular to the air bearing surface. Because the tri-layer stack does not need a pinning layer, the layer structure is simplified, and the potential to easily reduce the layer thickness of the magnetic field detecting element is provided.

To improve performance of the magnetic field detecting element, in an initial magnetization state (a state in which only the bias magnetic field is applied), the magnetization direction of the upper magnetic layer and the magnetization direction of the lower magnetic layer have to be approximately perpendicular to each other, and need to make an angle of 45° relative to the direction vertical to the air bearing surface. The more the magnetization direction of the upper magnetic layer and the magnetization direction of the lower magnetic layer become anti-parallel to each other, the more the electrical resistance value to sense current increases, and the more parallel the layers are to each other, the greater is the decrease in the electrical resistance value to sense current. That is, when the magnetization directions are perpendicular to each other in the initial magnetization state, change in an output increases in accordance with change in an external magnetic field, which can provide a large resistivity change. Further, when the magnetization direction of the upper magnetic layer and the magnetization direction of the lower magnetic layer make an angle of 45° relative to the direction vertical to the air bearing surface in the initial magnetization state, the magnetization directions take an approximately symmetric direction relative to the direction vertical to the air bearing surface even if the external magnetic field from a recording medium is applied. Accordingly, an output waveform for the external magnetic field becomes approximately symmetric relative to the output in the initial magnetization state, which improves linearity of the output in the vicinity of the initial magnetization state. Therefore, the detection performance of the magnetic field detecting element can be improved by implementing the magnetization directions as described above in the initial magnetization state.

To implement the magnetization directions in a manner described above in the initial magnetization state, the magnetization directions of the upper and lower magnetic layers are made anti-parallel to each other and parallel to the track width direction in a state not having a bias magnetic field. At this time, the bias magnetic field implements a desired magnetization direction in the initial magnetization state.

In the magnetic field detecting element disclosed in U.S. Pat. No. 7,035,062 and U.S. Pat. No. 7,177,122, the magnetization directions of the upper and lower magnetic layers are made anti-parallel to each other by exchange coupling through the non-magnetic intermediate layer when the bias magnetic field supplied by the bias magnetic layer and the external magnetic field supplied by the recording medium are not present. However, there is no mechanism that will make the magnetization directions of the upper and lower magnetic layers parallel to the track width direction. That is, the magnetization directions of the upper and lower magnetic layers may take various directions in the layer surface when a bias magnetic field is not present. The more the magnetization directions of the upper and lower magnetic layers shift from the track width direction, the lower is the detection performance of the magnetic field detection element. Further, when a plurality of magnetic field detecting elements is created, there also is a problem in which the output characteristics are different element-by-element because the magnetization directions in the initial magnetization state are different element-by-element. At this time, the number of stacks that are available as the magnetic field detecting element decreases, and productivity of the magnetic field detecting element lowers.

SUMMARY OF THE INVENTION

The present invention is directed to a magnetic field detecting element of the CPP type having a stack of a tri-layer structure. An object of the present invention is to provide a magnetic field detecting element having the layer structure described above, in which the effective read track width can be reduced. Another object of the present invention is to improve detection performance and productivity of such magnetic field detecting element.

In accordance with one embodiment of the present invention, a magnetic field detecting element comprises; a stack including an upper magnetic layer and a lower magnetic layer, and a non-magnetic intermediate layer sandwiched between said upper magnetic layer and said lower magnetic layer, wherein magnetization of said upper magnetic layer and said lower magnetic layer changes in accordance with an external magnetic field; an upper shield electrode layer and a lower shield electrode layer which is provided to sandwich said stack therebetween in a direction of the stacking of said stack, wherein said upper shield electrode layer and said lower shield electrode layer supply sense current in the direction of stacking, and magnetically shield said stack; a bias magnetic layer which is provided on a surface of said stack opposite to an air bearing surface, and wherein said bias magnetic layer applies a bias magnetic field to said upper magnetic layer and said lower magnetic layer in a direction perpendicular to the air bearing surface; and insulating layers which are provided on both sides of said stack in a track width direction thereof, wherein a stepped portion is formed so that a length of said upper magnetic layer in the track width direction is different from that of said lower magnetic layer.

According to this structure, the magnetization direction of a magnetic layer which has a larger length in regard to the length of an upper magnetic layer in the track width direction and the length of a lower magnetic layer in the track width direction is made parallel to the track width direction due to shape magnetic anisotropy in a state that does not have a bias magnetic field. At this time, because the upper magnetic layer and the lower magnetic layer are antiferromagnetically connected to each other by exchange coupling, the magnetization direction of the upper magnetic layer and the magnetization direction of the lower magnetic layer are made in the anti-parallel direction. Then, due to the bias magnetic field applied by a bias magnetic layer, the magnetization direction of the upper magnetic layer and the magnetization direction of the lower magnetic layer are approximately perpendicular to each other in a state that does not have an external magnetic field, and make an angle of 45° relative to the direction perpendicular to the air bearing surface, respectively. As described above, the desired magnetized state can be provided in an initial magnetization state, which allows the detection performance and the productivity of the magnetic field detecting element to be improved. Further, the effective read track width can be reduced by decreasing one of the lengths in the track width direction of the upper and lower magnetic layers.

Also, another object of the present invention is to provide a magnetic recording device in which a recording track width can be reduced. According to one embodiment of the present invention, the magnetic recording device includes the magnetic field detecting element and a discrete medium as a recording medium. Lengths in the track width direction of the upper magnetic layer and the lower magnetic layer of the stack in the magnetic field detecting element are determined dependent on the recording track width and the guard band width of the discrete medium. Accordingly, in the discrete medium having a narrow recording track width, signal outputting by the magnetic field detecting element can be maintained, and an effect due to the output of an adjacent track (crosstalk) can be controlled.

The above and another objects, features and advantages of the present invention will be clear from the following description with reference to the accompanying drawings illustrating the present invention.

BEST MODE FOR CARRYING OUT THE INVENTION

Now, one embodiment of the present invention will be hereinafter described with reference to the drawings. A magnetic field detecting element of the present embodiments may be suitably used especially as a reproducing element for reproduction of a thin film magnetic head in a magnetic recording device.

First Embodiment

Figure 1:
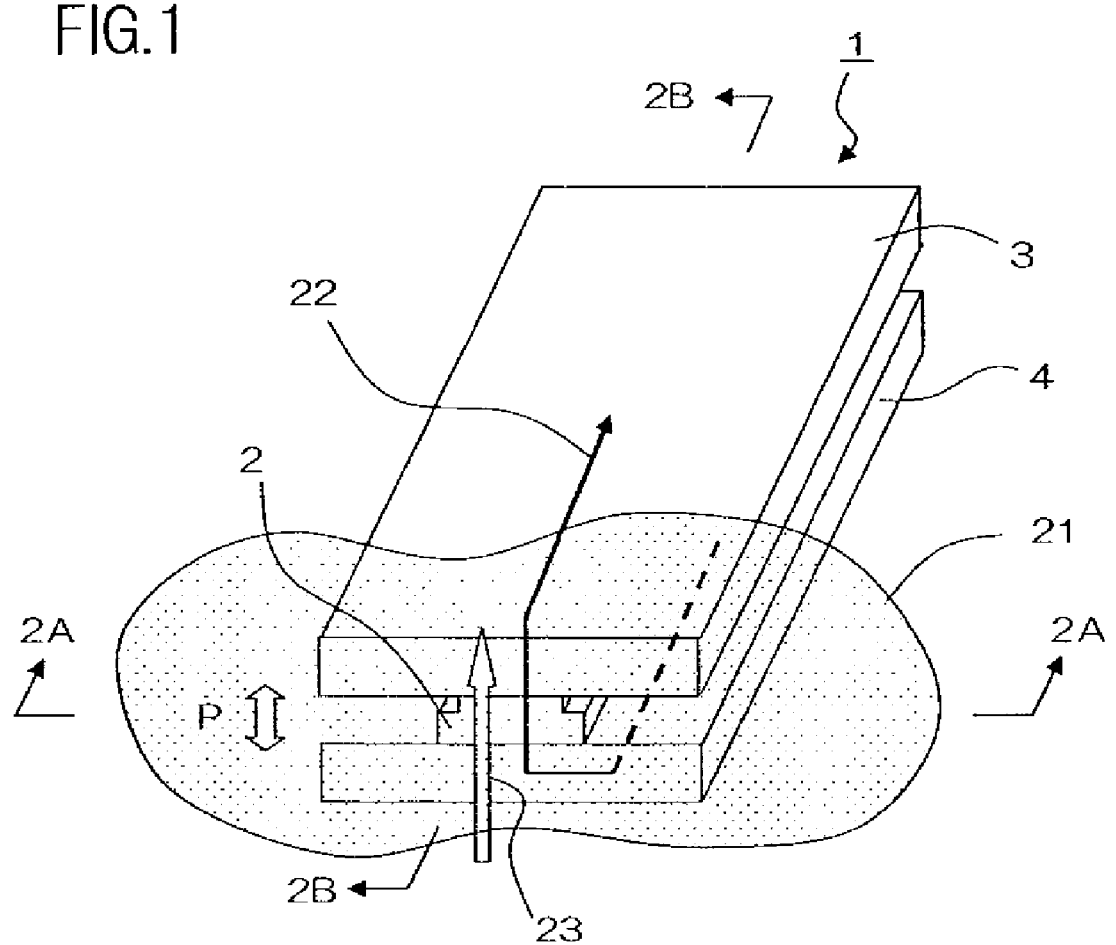
FIG. 1 is a conceptual perspective view of a magnetic field detecting element according to one embodiment of the present invention.
Figure 2A:
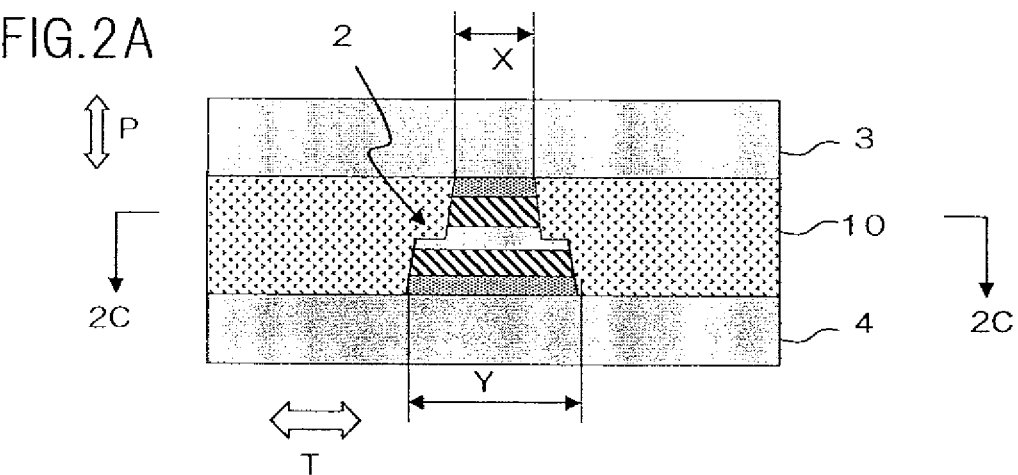
FIG. 2A is a side view of the magnetic field detecting element when viewed from the 2A-2A direction in FIG. 1.
Figure 2B:
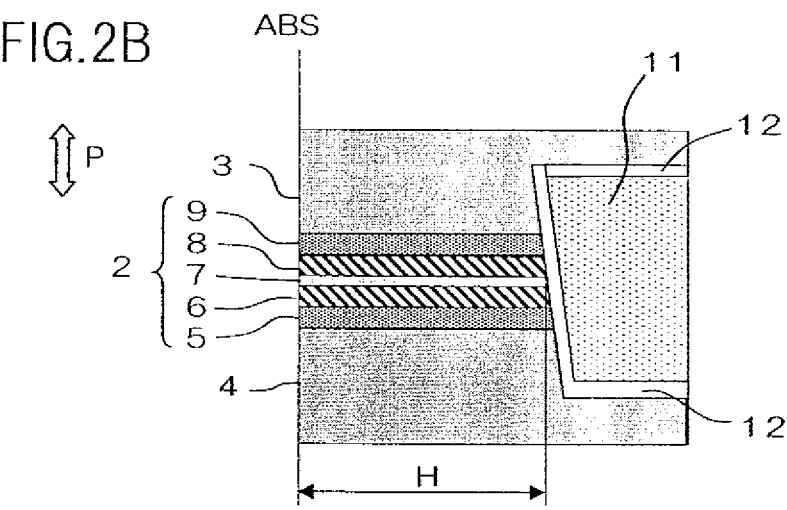
FIG. 2B is a cross-section view of the magnetic field detecting element, taken along the 2B-2B line in FIG. 1.
Figure 2C:
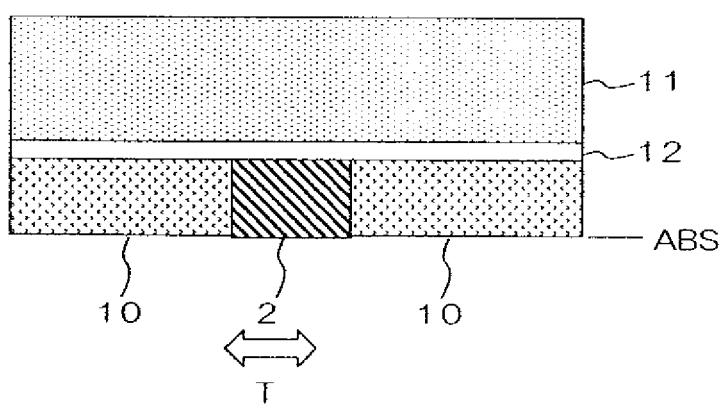
FIG. 2C is a cross-section view of the magnetic field detecting element, taken along the 2C-2C line in FIG. 2A.

FIG. 1 is a conceptual perspective view of a magnetic field detecting element of the present embodiment. FIG. 2A is a side view of the magnetic field detecting element when viewed from the direction 2A-2A in FIG. 1, that is, an air bearing surface. FIG. 2B is a cross-section view of the magnetic field detecting element, taken along the 2B-2B line in FIG. 1. FIG. 2C is a cross-section view of the magnetic field detecting element, taken along the 2C-2C line in FIG. 2A. The Air Bearing Surface (ABS) refers to the surface of magnetic field detecting element 1 that faces recording medium 21.

Magnetic field detecting element 1 includes stack 2, upper shield electrode layer 3 and lower shield electrode layer 4 provided to sandwich stack 2 therebetween in the direction of the stacking of stack 2, bias magnetic layer 11 provided on a surface of stack 2 on the opposite side of air bearing surface ABS, and insulating layer 10 provided on both sides of stack 2 in track width direction T.

Stack 2 includes upper magnetic layer 8, lower magnetic layer 6, and non-magnetic intermediate layer 7 sandwiched between upper magnetic layer 8 and lower magnetic layer 6. Stack 2 has a stepped portion in non-magnetic intermediate layer 7 so that track width Y of lower magnetic layer 6 (length of layer in track width direction T) is larger than track width X of upper magnetic layer 8 (length of layer in track width direction T). Further, track width Y of lower magnetic layer 6 is larger than height H of stack 2 (length in the direction perpendicular to air bearing surface ABS). Accordingly, lower magnetic layer 6 has shape magnetic anisotropy, and the magnetization direction of lower magnetic layer 6 is made in a direction parallel to track width direction T. Upper magnetic layer 8 is magnetically connected with lower magnetic layer 6 by antiferromagnetic coupling through non-magnetic intermediate layer 7. Therefore, the magnetization direction of upper magnetic layer 8 and the magnetization direction of lower magnetic layer 6 are made in an anti-parallel direction. That is, the magnetization directions of upper magnetic layer 8 and lower magnetic layer 6 equals track width direction T in a case in which there is no bias magnetic field. As described above, because the magnetization direction of lower magnetic layer 6 is fixed due to shape magnetic anisotropy, each element can be controlled not to take a different magnetization direction element-by-element when a plurality of magnetic field detecting elements is manufactured. Further, the effective read track width of magnetic field detecting element 1 can become smaller according to the structure in which track width X of upper magnetic layer 8 is made smaller.

Stack 2 is disposed so that it is sandwiched between upper shield electrode layer 3 and lower shield electrode layer 47 and a tip portion thereof is exposed on air bearing surface ABS. A voltage applied between upper shield electrode layer 3 and lower shield electrode layer 4 makes sense current 22 flow in stack 2 in direction P perpendicular to a layer surface.

A magnetic field of recording medium 21 at a position facing stack 2 changes in accordance with the movement of recording medium 21 that moves in moving direction 23. The change in the magnetic field is detected as change in electric resistance which is caused by the magneto-resistance effect. Magnetic field detecting element 1 reads magnetic information recorded in each magnetic domain of recording medium 21 based on this principle.

Table 1 shows one example of a layer structure of stack 2. In Table 1, the layers structure is shown upward from below in the order of stacking from buffer layer 5 on the side of lower shield electrode layer 4 to cap layer 9 on the side of upper shield electrode layer 3. Stack 2 is formed by stacking buffer layer 5, lower magnetic layer 6, non-magnetic intermediate layer 7, upper magnetic layer 8, and cap layer 9 on lower shield electrode layer 4 in this order.

TABLE 1

| Layer Structure | Composition | Thickness (nm) |
| --- | --- | --- |
| Cap Layer 9 | Ta | 2.0 |
|  | Ru | 5.5 |
|  | Cu | 1.5 |
| Upper Magnetic Layer 8 | CoFe | 1.0 |
|  | NiFe | 2.5 |
|  | CoFe | 1.0 |
| Non-magnetic Intermediate Layer 7 | Cu | 1.1 |
| Lower Magnetic Layer 6 | CoFe | 1.0 |
|  | NiFe | 2.5 |
|  | CoFe | 1.0 |
| Buffer Layer 5 | NiCr | 5.0 |
|  | Ta | 1.0 |
|  | (Total) | 25.1 |

Buffer layer 5 is provided as a seed layer for lower magnetic layer 6. Lower magnetic layer 6 and upper magnetic layer 8 both have a layer structure in which a NiFe layer is sandwiched between CoFe layers, and layers 6, 8 are magnetic layers whose magnetization directions are changed in accordance with an external magnetic field. Non-magnetic intermediate layer 7 is composed of Cu. the Cu layer has a layer thickness of 1.1 nm.

BY providing the CoFe layers in lower magnetic layer 6 and upper magnetic layer 8, spin polarizability of the interface of the Cu layer becomes larger compared to a layer structure in which the Cu layer is directly in contact with the NiFe layer. Thus, the magneto-resistance effect increases. One or both of lower magnetic layer 6 and upper magnetic layer 8 may use a single layer structure composed of the CoFe layer instead of the structure in Table 1. Cap layer 9 is provided to prevent deterioration of each stacked layer. Upper shield electrode layer 3 is formed on cap layer 9.

Upper shield electrode layer 3 and lower shield electrode layer 4 are electrodes for supplying sense current to stack 2 in the direction of stacking P, and are shield layers for shielding from a magnetic field emitted from an adjacent bit on the same track of recording medium 21.

Bias magnetic layer 11 is provided to face an opposite surface of air bearing surface ABS of stack 2. Bias magnetic layer 11 is formed between lower shield electrode layer 4 and upper shield electrode layer 3. Insulating film 12 composed of an $Al_2O_3$ layer is formed between bias magnetic layer 11 and lower shield electrode layer 4, and between bias magnetic layer 11 and upper shield electrode layer 3. Insulating film 12 prevents sense current 22 from flowing in bias magnetic layer 11.

Table 2 shows one example of the structure of bias magnetic layer 11. Bias magnetic layer 11 has a structure in which a Cr layer, a CoPt layer, and a Cr layer are stacked upward from below from lower shield electrode layer 4 to upper shield electrode layer 3 of stack 2. The Cr layer is provided to give the CoPt layer better magnetic characteristics (high coercive force, squareness ratio).

TABLE 2

|  | Composition | Thickness (nm) |
| --- | --- | --- |
| Bias Magnetic Layer 11 | Cr | 7.0 |
|  | CoPt | 30.0 |
|  | Cr | 3.5 |

Bias magnetic layer 11 applies a bias magnetic field in a direction perpendicular to air bearing surface ABS, to stack 2 and especially to upper magnetic layer 8 and lower magnetic layer 6. Then, the magnetization directions of upper magnetic layer 8 and lower magnetic layer 6 form a relative angle of about 90° in the initial magnetization state, and further form an angle of 45° relative to the direction perpendicular to air bearing surface ABS. Therefore, magnetic field detecting element 1 of the present embodiment can have better detection performance.

Figure 3:
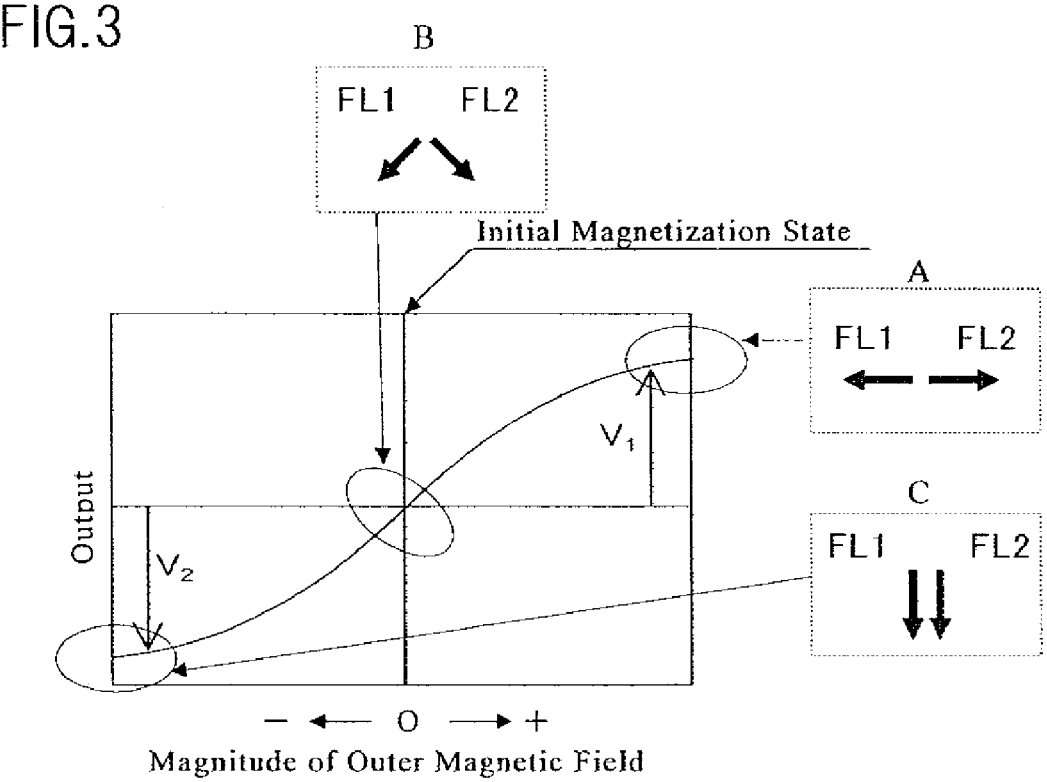
FIG. 3 is a conceptual view for illustrating an operational principle of a magnetic field detecting element having a tri-layer stack.

FIG. 3 is a conceptual view showing an operational principle of magnetic field detecting element 1 of the present embodiment. The horizontal axis shows the external magnetic field strength, and the longitudinal axis shows the output from magnetic field detecting element 1. In FIG. 3, the magnetization direction of upper magnetic layer 8 and the magnetization direction of lower magnetic layer 6 are indicated by FL1 and FL2, respectively. When no bias magnetic field is emitted from bias magnetic layer 11 and an external magnetic field is not applied by recording medium 21, then upper magnetic layer 8 and lower magnetic layer 6 are connected to each other by exchange coupling through non-magnetic intermediate layer 7. Thereby, each magnetization direction is made in an anti-parallel direction. Actually, because a bias magnetic field is applied, the magnetization direction of upper magnetic layer 8 and the magnetization direction of lower magnetic layer 6 are rotated from an anti-parallel state toward a parallel state, so that the magnetization directions of the upper magnetic layer and the lower magnetic layer form a relative angle of about 90° (B in FIG. 3) in the initial magnetization state. Then, when the external magnetic field from recording medium 21 is applied, the relative angle between the magnetization direction of upper magnetic layer 8 and the magnetization direction of lower magnetic layer 6 increases (toward the anti-parallel state) or decreases (toward the parallel state), dependent on the direction of the magnetic field. As they come closer to the anti-parallel state, electrons supplied by the electrode tend to be easily scattered, and thereby the electric resistance value of sense current 22 is increased (A in FIG. 3). As they come closer to the parallel state, the electrons emitted from the electrode tend not to be easily scattered, and thereby the electric resistance value of sense current 22 is reduced (C in FIG. 3). By utilizing the change in the relative angle between the magnetization direction of upper magnetic layer 8 and the magnetization direction of lower magnetic layer 6, the external magnetic field can be detected.

Next, comparison results of magnetic field detecting element 1 of the present embodiment with a magnetic field detecting element including an upper magnetic layer and a lower magnetic layer having the same track width will be described. It was assumed that the magnetic field detecting element had the same layer structure of the stack as that in Tables 1 and 2 described above. Further, height H of stack 2 was 70 nm, and track width X of upper magnetic layer 8 was 70 nm. Then, a plurality of magnetic field detecting elements 1 including lower magnetic layers 6 having different track widths Y was manufactured, and the standard deviation σ of waveform asymmetry of an output of magnetic field detecting element 1 was measured. Here, the waveform asymmetry is defined by the expression $\{(V_1-|V_2|)/(V_1+|V_2|)\times 100\}$, where $V_1$ is an output (output as different from an output in the initial magnetization state) when the external magnetic field in one direction is applied, and $V_2$ is an output (output as different from an output in the initial magnetization state) when the external magnetic field in the reverse direction is applied (see FIG. 3). That is, the large standard deviation σ shows that the waveform asymmetry for the external magnetic field is dispersed between each element when a plurality of magnetic field detecting elements 1 having the same structure is manufactured.

On the measurement, a discrete track media (described later) having recording track width Tw of 50 nm, and guard band Tg of 70 nm as recording medium 21 was used. Then, a bar having 120 elements were taken out from a wafer in which stack 2 that constitutes magnetic field detecting element 1 was formed, and Quasi Static Test (QST) was performed with an external magnetic field of ±40,000 A/m being applied to magnetic field detecting element 1.

TABLE 3

|  | Track Width Y of Lower Magnetic Layer 6 (nm) | Ratio Y/X of Track Width | Standard Deviation σ(%) |
| --- | --- | --- | --- |
| Comparative Example | 71 | 1.01 | 28.9 |
| First Embodiment | 77 | 1.10 | 18.4 |
|  | 85 | 1.21 | 15.6 |
|  | 103 | 1.47 | 13.3 |
|  | 109 | 1.56 | 12.2 |
|  | 121 | 1.73 | 11.9 |
|  | 148 | 2.11 | 11.5 |
|  | 189 | 2.70 | 11.0 |

Figure 4:
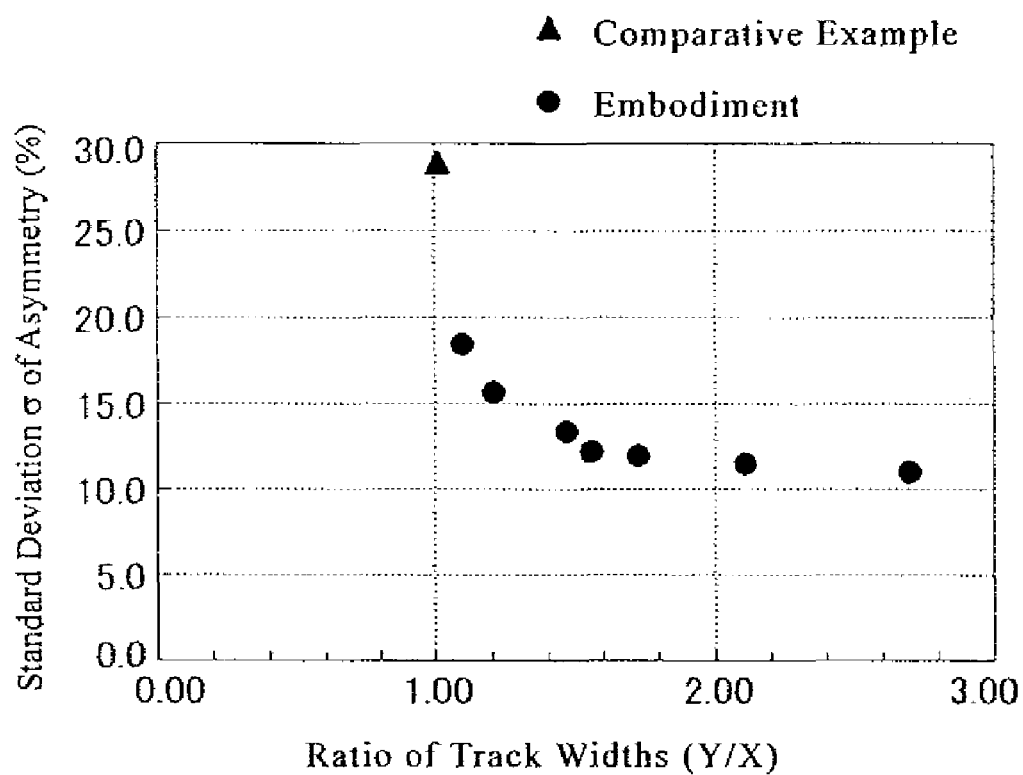
FIG. 4 is a graph showing the relationship between lengths of the layers in the track width direction of the upper and lower magnetic layers and waveform asymmetry of an output.

Table 3 shows the relationship between track width Y of lower magnetic layer 6 and the standard deviation σ of the waveform asymmetry. Table 3 also shows a ratio Y/X of track width Y of lower magnetic layer 6 and track width X of upper magnetic layer 8. Here, when track width X of upper magnetic layer 8 was 70 nm (when it was the same width as track width Y of lower magnetic layer 6), measurement results were shown as a comparative example FIG. 4 is a graph showing the relationship between the ratio of the track widths (Y/X) and the standard deviation σ.

The standard deviation σ decreases as the ratio of the track widths (Y/X) increases. When the ratio of the track widths (Y/X) is 1.2, compared to the case where the ratio of the track widths (Y/X) is 1.0, the value of the standard deviation σ is approximately ½. Accordingly, the ratio of the track widths (Y/X) is desirably equal to or larger than 1.2. The graph for illustrating the standard deviation σ shows an inflection point at the ratio of the track widths (Y/X) of about 1.5, and the standard deviation σ rapidly decreases. Therefore, the ratio of the track widths (Y/X) is desirably equal to or larger than 1.5.

The above measurement also led to the same conclusion regarding the aspect ratio of the lower magnetic layer (Y/H). That is, the standard deviation σ shows a monotonically decreasing graph having an infection point at the aspect ratio of the lower magnetic layer (Y/H) of about 1.5. Then, when the aspect ratio (Y/H) reaches about 1.2, compared to the case where the aspect ratio (Y/H) is 1.0 (when shape magnetic anisotropy is not present), the standard deviation σ is approximately ½.

Second Embodiment

Figure 5A:
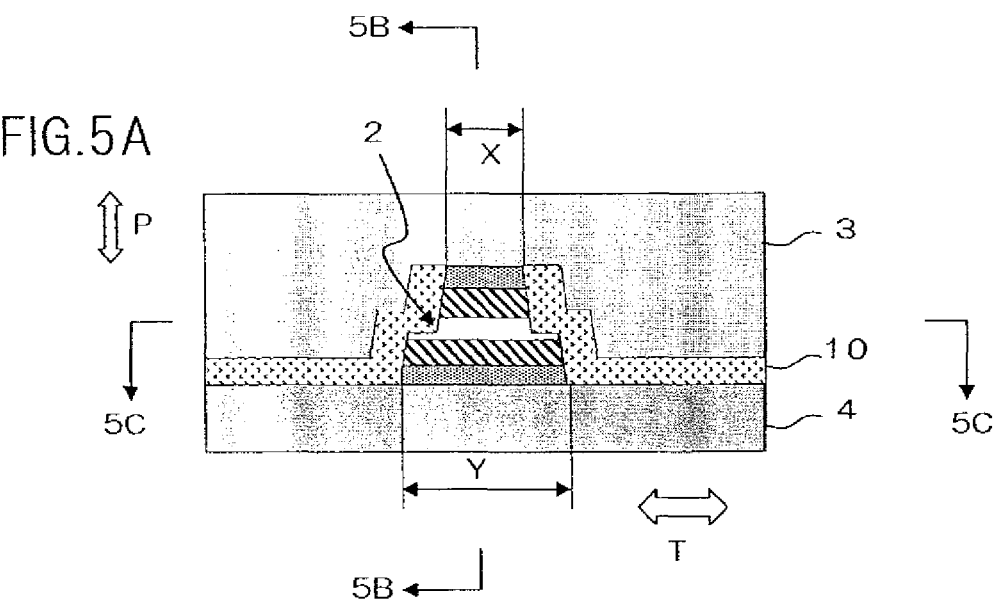
FIG. 5A is a side view of a magnetic field detecting element according to another embodiment of the present invention when viewed from an air bearing surface.
Figure 5B:
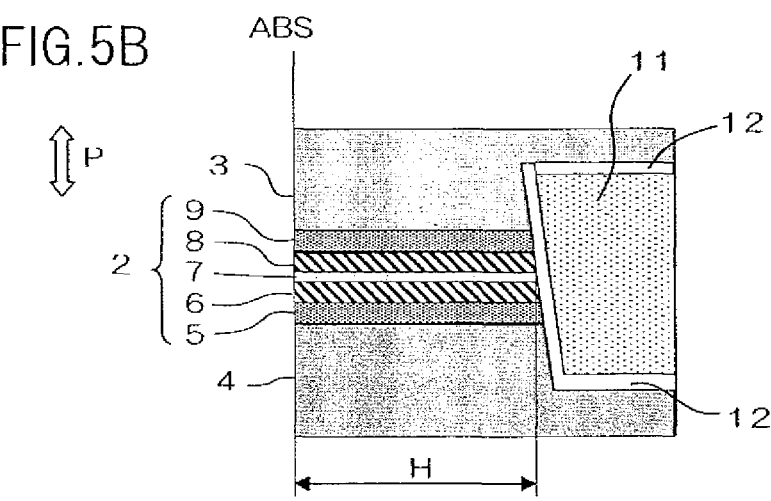
FIG. 5B is a cross-section view of the magnetic field detecting element, taken along the 5B-5B line in FIG. 5A.
Figure 5C:
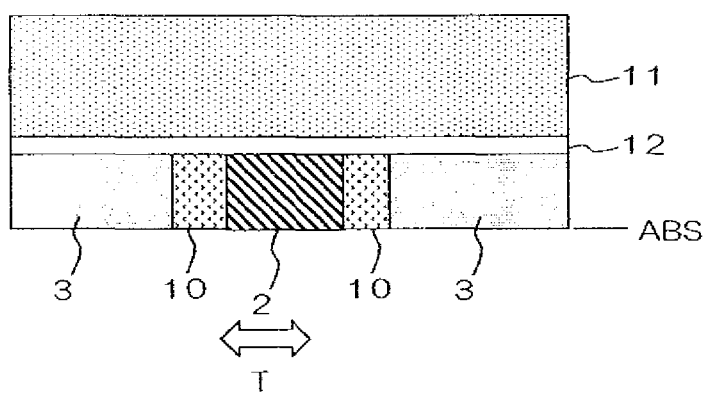
FIG. 5C is a cross-section view of the magnetic field detecting element, taken along the 5C-5C line in FIG. 5A.

Next, a magnetic field detecting element having another structure of the present invention will be described as a second embodiment. FIG. 5A is a side view of the magnetic field detecting element according to the second embodiment when viewed from air bearing surface ABS. FIG. 5B is a cross-section view of the magnetic field detecting element, taken along 5B-5B line in FIG. 5A. FIG. 5C is a cross-section view of the magnetic field detecting element, taken along the 5C-5C line in FIG. 5A. Magnetic field detecting element 1 includes stack 2, upper shield electrode layer 3 and lower shield electrode layer 4 provided to sandwich stack 2 in the stacking direction therebetween, bias magnetic layer 11 provided on a surface of stack 2 opposite to air bearing surface ABS, and insulating layer 10 provided on both sides of stack 2 in track width direction T.

Stack 2 includes upper magnetic layer 8, lower magnetic layer 6, and non-magnetic intermediate layer 7 sandwiched between upper magnetic layer 8 and lower magnetic layer 6. Stack 2 has a stepped portion in non-magnetic intermediate layer 7 so that track width Y of lower magnetic layer 6 is larger than track width X of upper magnetic layer 8.

As shown in FIGS. 5A to 5C, upper shield electrode layer 3 is formed to cover both sides of stack 2 in track width direction T through insulating layer 10. This structure is a different from the magnetic field detecting element described in the first embodiment. Accordingly, upper shield electrode layer 3 shields the stack from a magnetic field emitted from an adjacent track of recording medium 21 due to this structure. Stack 2 used the same layer structure as that shown in Tables 1 and 2.

An effect of shielding from the magnetic field emitted from an adjacent track of recording medium 21 will be hereinafter described, compared to the magnetic field detecting element of the first embodiment. For this purpose, a plurality of magnetic field detecting elements 1 including upper magnetic layers 8 having different track widths X was manufactured and an effective read track width was measured in the way described below. First, magnetic information of recording medium 21 was erased from both sides in the track width direction to form a micro-track with a recording track width of about 20 nm. Subsequently, a track profile of a thin film magnetic head using magnetic field detecting element 1 was measured on this micro-track. Then, the effective read track width was decided as a half width of the track profile. In this experiment, after the thin film magnetic heads were removed from a wafer in a bar, individual thin film magnetic heads were further manufactured, and evaluated on a spin stand.

Figure 6:
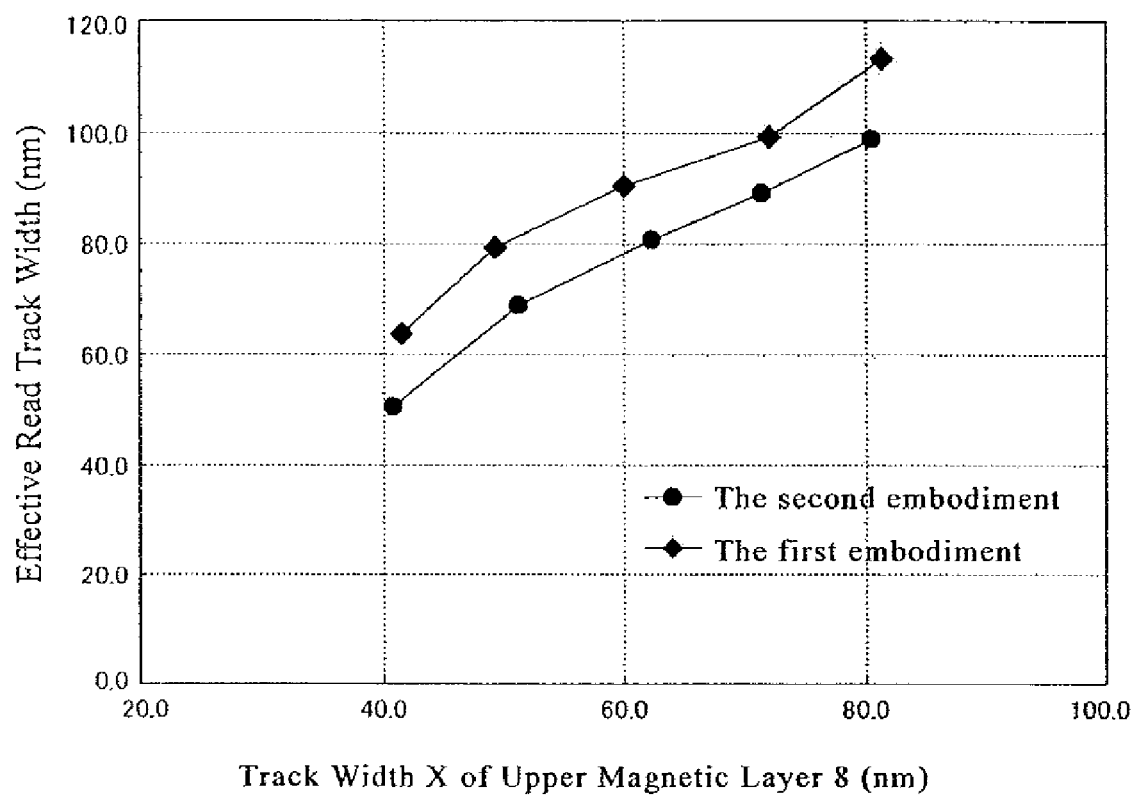
FIG. 6 is a graph showing the relationship between the length of an upper magnetic layer in the track width direction and an effective read track width.

Table 4 shows the relationship between track width X of upper magnetic layer 8 and the effective read track width in the magnetic field detecting elements of the first and second embodiments. Here, track width X of upper magnetic layer 8 was measured by a scanning electron microscope (SEM). FIG. 6 illustrates the relationship shown in Table 4, as a graph.

TABLE 4

| Second Embodiment | | First Embodiment | |
|---|---|---|---|
| Track Width X of Upper Magnetic Layer 8 (nm) | Effective Read Track Width (nm) | Track Width X of Upper Magnetic Layer 8 (nm) | Effective Read Track Width (nm) |
| 40.8 | 50.6 | 41.5 | 63.7 |
| 51.2 | 69.0 | 49.2 | 79.4 |
| 62.3 | 80.8 | 60.0 | 90.5 |
| 71.4 | 89.2 | 72.0 | 99.3 |
| 80.5 | 99.0 | 81.3 | 113.5 |

Magnetic field detecting element 1 in the second embodiment has a narrower effective read track width, compared to the magnetic field detecting element of the first embodiment. That is, magnetic field detecting element 1 in the second embodiment has a shielding effect from a magnetic field emitted from an adjacent track. Thus, there is provided a magnetic field detecting element that can correspond to a recording medium having a high track density. Therefore, magnetic field detecting element 1 may more desirably use the structure of the second embodiment.

Figure 7A:
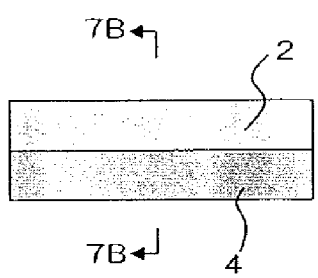
FIGS. 7A to 21C are step diagrams for explaining a method for manufacturing the magnetic field detecting element shown in FIG. 1.
Figure 7B:
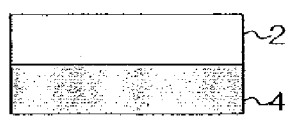
Figure 7C:
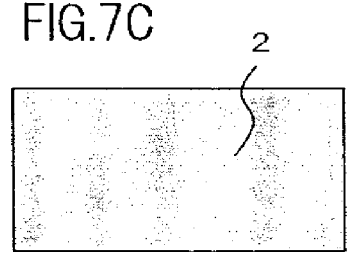
Figure 8A:
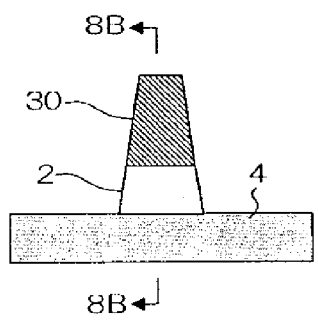
Figure 8B:
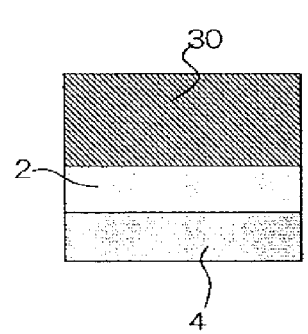
Figure 8C:
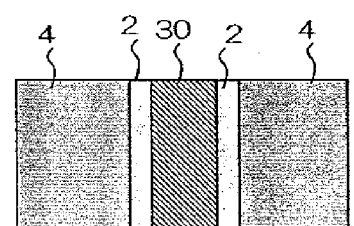
Figure 9A:
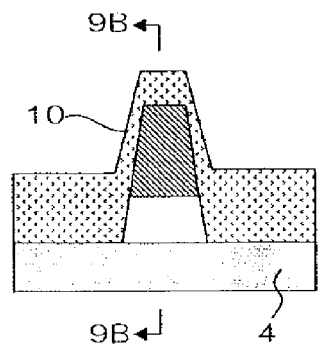
Figure 9B:
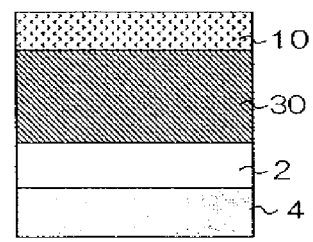
Figure 9C:
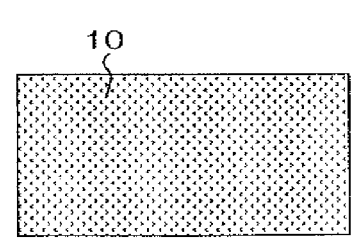
Figure 17A:
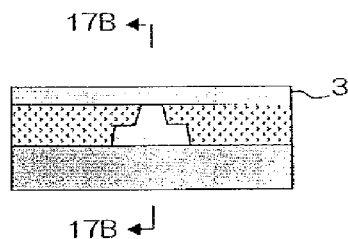
Figure 17B:
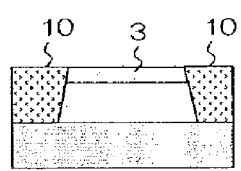
Figure 17C:
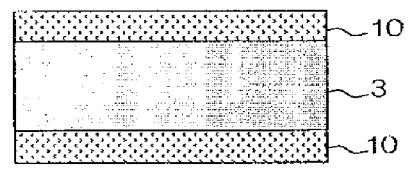
Figure 18A:
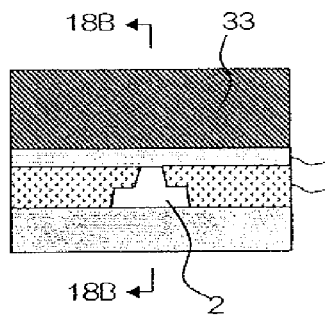
Figure 18B:
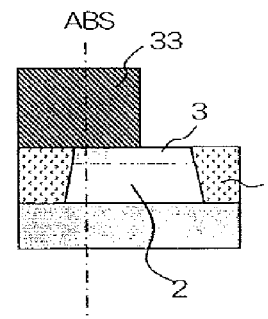
Figure 18C:
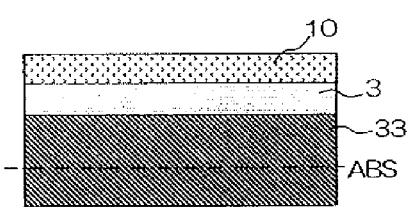

Next, a method for manufacturing magnetic field detecting element 1 of the first embodiment will be described referring to FIGS. 7A to 18C. FIGS. 7A, 8A, to 18A are cross-section views of a wafer, taken along a surface forming recording medium 21. FIGS. 7B, 8B, to 18B are cross-section views of the wafer, cut out in a direction perpendicular to the surface forming recording medium 21. FIGS. 7C, 8C, to 18C are top views of the wafer. Positions of the cross-sections in FIGS. 7B, 8B, to 18B are shown in FIGS. 7A, 8A, to 18A, respectively.

First, lower shield electrode layer 4 is formed by a plating process. Next, as shown in FIGS. 7A to 7C, stack 2 is formed on lower shield electrode layer 4 by sputtering. Stack 2 includes lower magnetic layer 6 whose magnetization direction changes in accordance with an external magnetic field, non-magnetic intermediate layer 7, and upper magnetic layer 8 whose magnetization direction changes in accordance with the external magnetic field. Lower magnetic layer 6, non-magnetic intermediate layer 7, and upper magnetic layer 8 are included in stack 2 upward in this order from the lower side toward the upper side with regard to the direction of stacking. Cap layer 9 is included on upper magnetic layer 8.

Figure 10A:
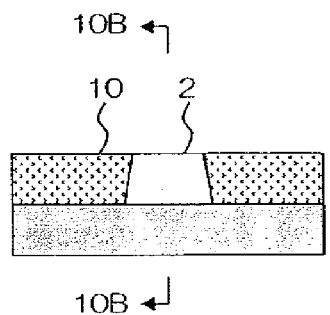
Figure 10B:
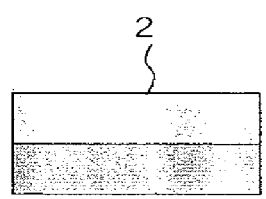
Figure 10C:
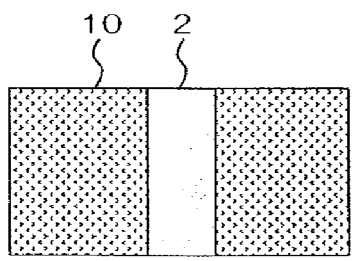

Next, both sides of track 2 are removed to make track width Y of lower magnetic layer 6 into a predetermined size in the track width direction and the removed portions are again filled with insulating layer 10. Specifically, as shown in FIGS. 8A to 8C, resist 30 is formed on stack 2 and is then formed into a predetermined shape. Subsequently, using resist 30 as a mask, stack 2 is removed. In such a manner, track width Y of lower magnetic layer 6 is made into a predetermined size. Subsequently, insulating layer 10 composed of $Al_2O_3$ is stacked on the portion where stack 2 is removed (see FIGS. 9A to 9C). Further, as shown in FIGS. 10A to 10C, resist 30 and insulating layer 10 are removed by a lift-off process.

Figure 11A:
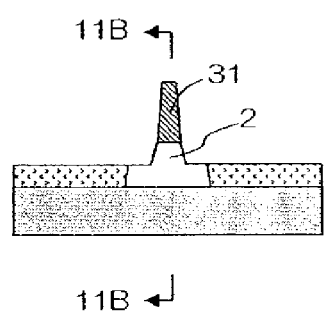
Figure 11B:
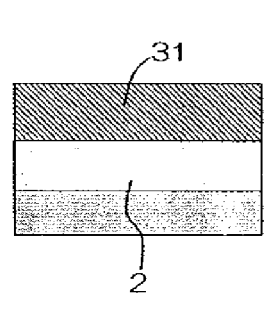
Figure 11C:
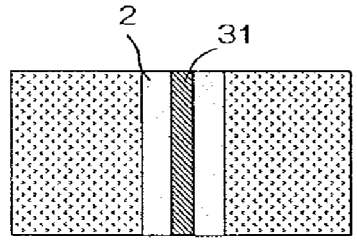
Figure 12A:
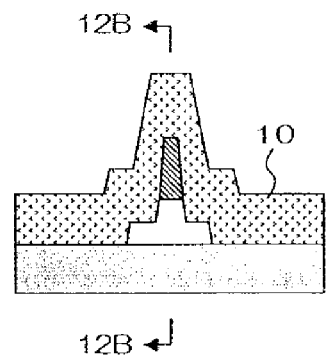
Figure 12B:
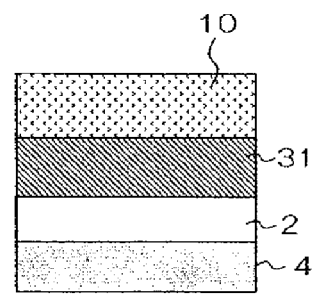
Figure 12C:
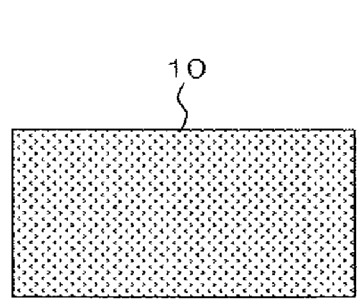
Figure 13A:
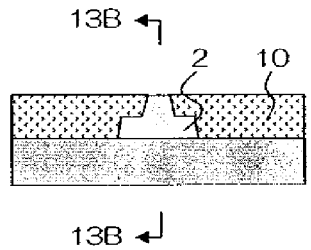
Figure 13B:
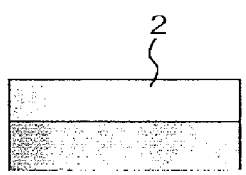
Figure 13C:
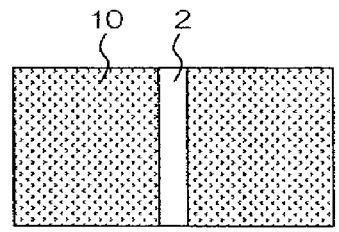

Next, to make track width X of upper magnetic layer 8 into a predetermined size, both sides of track 2 in the track width direction are removed to approximately near the central portion of non-magnetic intermediate layer 7, and the removed portions are again filled with insulating layer 10. Specifically, as shown in FIGS. 11A to 11C, resist 31 is formed on stack 2 and is then formed into a predetermined shape. Subsequently, using resist 31 as a mask, stack 2 is removed to approximately near the central portion of non-magnetic intermediate layer 7. Subsequently, insulating layer 10 composed of $Al_2O_3$ is laminated on the portion where stack 2 is removed (see FIGS. 12A to 12C). Further, as shown in FIGS. 13A to 13C, resist 31 and insulating layer 10 are removed by a lift-off process.

Figure 14A:
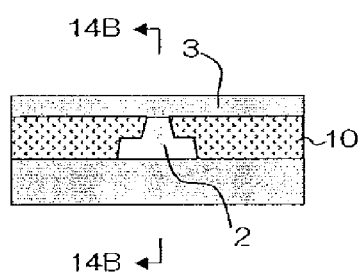
Figure 14B:
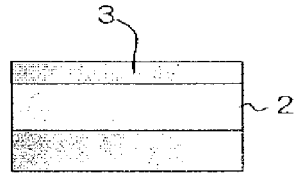
Figure 14C:
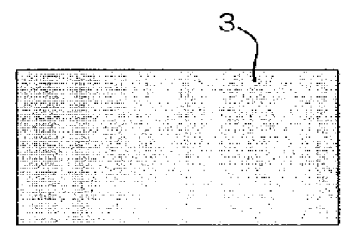

Next, as shown in FIGS. 14A to 14C, upper shield electrode layer 3 is formed on insulating layer 10 and stack 2 by sputtering. A layer thickness of upper shield electrode layer 3 is be determined by the size of bias magnetic layer 11 formed in a later step.

Figure 15A:
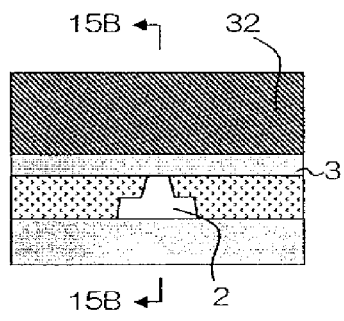
Figure 15B:
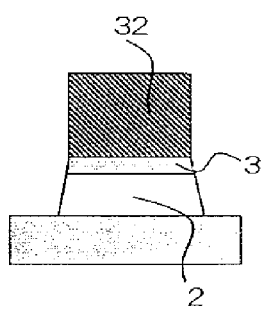
Figure 15C:
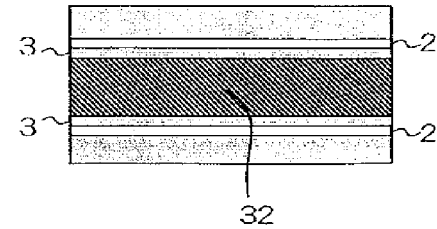
Figure 16A:
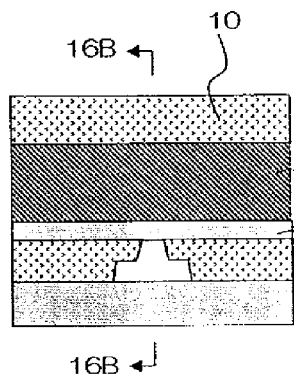
Figure 16B:
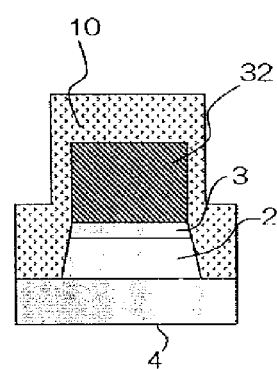
Figure 16C:
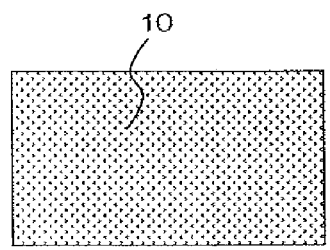

Next, both sides of track 2 are removed in a direction perpendicular to air bearing surface ABS, and the removed portions are again filled with insulating layer 10. Specifically, as shown in FIGS. 15A to 15C, resist 32 is formed on upper shield electrode layer 3 and is then formed into a predetermined shape. Subsequently, using resist 32 as a mask, stack 2 is removed. Then, insulating layer 10 composed of $Al_2O_3$ is laminated on the portion where stack 2 is removed (see FIGS. 16A to 16C). Further, as shown in FIGS. 17A to 17C, resist 32 and insulating layer 10 are removed by a lift-off process.

Figure 19A:
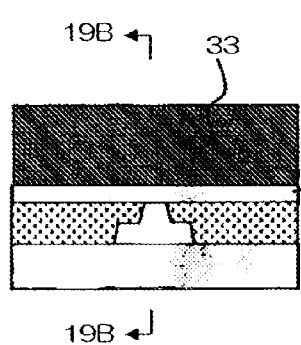
Figure 19B:
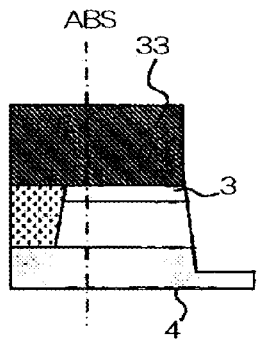
Figure 19C:
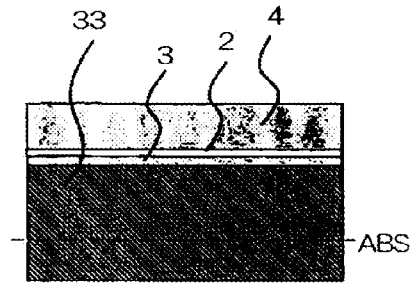

Next, upper shield electrode layer 3, stack 2, insulating layer 10 and a part of lower shield electrode layer 4 corresponding to an opposite surface of air bearing surface ABS are removed, and a part of the removed portions is filled with bias magnetic layer 11. First, as shown in FIGS. 18A to 18C, resist 33 is formed on upper shield electrode layer 3 and is then formed into a predetermined shape. Subsequently, as shown in FIGS. 19A to 19C, using resist 33 as a mask, a part of stack 2 on the opposite side of air bearing surface ABS is removed up to the mid point of lower shield electrode layer 4. Accordingly, the surface on the opposite side of air bearing surface ABS in stack 2 is formed into a steep shape.

Figure 20A:
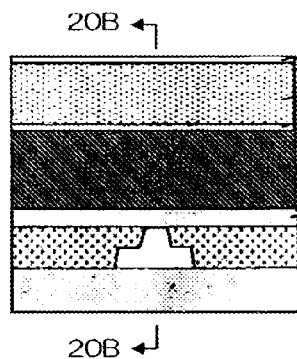
Figure 20B:
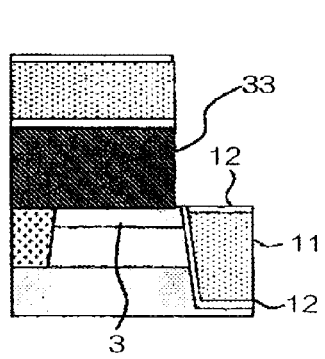
Figure 20C:
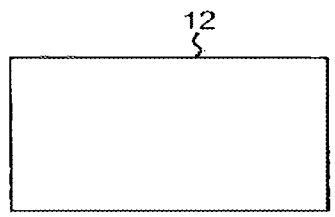

Then, as shown in FIGS. 20A to 20C, insulating film 12, bias magnetic layer 11, and insulating film 12 are stacked in turn. Insulating film 12 is formed by an ion beam sputtering process, or a low temperature CVD (chemical vapor deposition). Subsequently, resist 33 is removed by a lift-off process. After removing resist 33, chemical mechanical polishing (CMP) process is performed to an extremely slight degree to remove a burr to planarize surfaces.

Figure 21A:
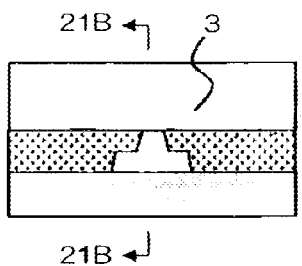
Figure 21B:
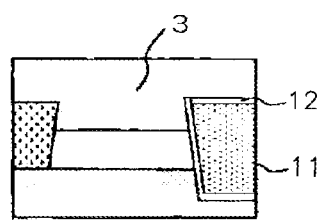
Figure 21C:
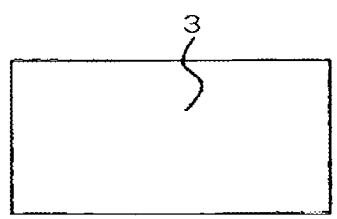

Next, as shown in FIGS. 21A to 21C, upper shield electrode layer 3 is formed above upper shield electrode layer 3 and insulating layer 12 that were already formed by a plating process. Accordingly, stack 2 is formed into a predetermined shape.

Subsequently, a write head portion is formed, the wafer is then diced into bars, and air bearing surface ABS is formed by polishing. Further, each bar is separated into sliders, and the sliders are completed after undergoing processes such as cleaning and inspection.

Figure 22A:
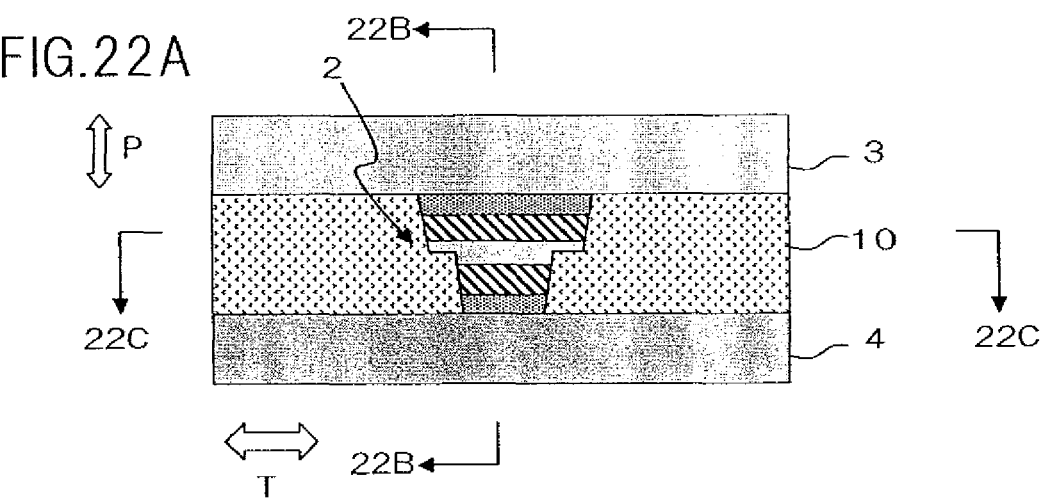
FIG. 22A is a side view of a magnetic field detecting element according to another embodiment of the present invention when viewed from an air bearing surface.
Figure 22B:
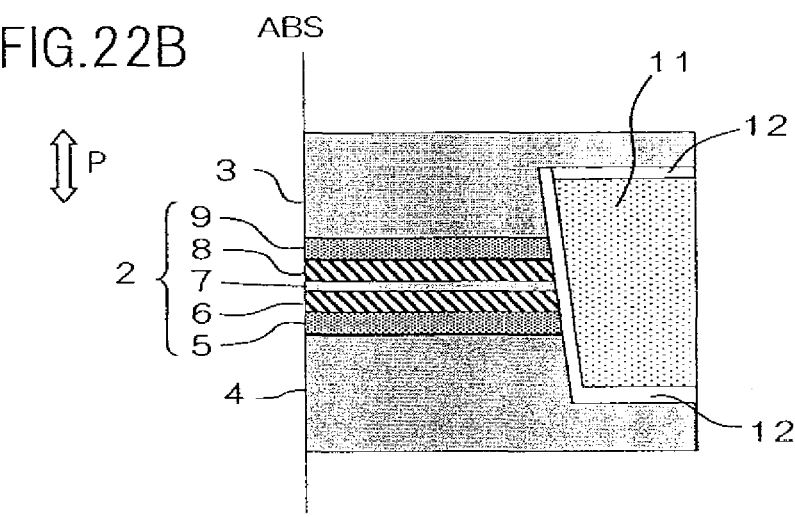
FIG. 22B is a cross-section view of the magnetic field detecting element, taken along the 22B-22B line in FIG. 22A.
Figure 22C:
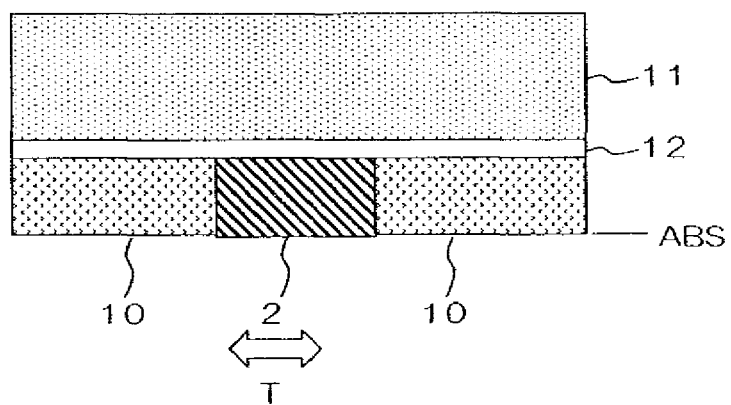
FIG. 22C is a cross-section view of the magnetic field detecting element, taken along the 22C-22C line in FIG. 22A.

As described above, the magnetic field detecting element of the present invention has been described in detail, but the present invention is not limited to the above embodiments. FIGS. 22A to 22C show a magnetic field detecting element having another structure of the present invention. FIG. 22A is a side view of the magnetic field detecting element when viewed from air bearing surface ABS. FIG. 22B is a cross-section view of the magnetic field detecting element, taken along the 22B-22B line in FIG. 22A. FIG. 22C is a cross-section view of the magnetic field detecting element, taken along the 22C-22C line in FIG. 22A. Magnetic field detecting element 1 includes stack 2, upper shield electrode layer 3 and lower shield electrode layer 4 provided to sandwich stack 2 in a stacking direction therebetween, bias magnetic layer 11 provided on a side of stack 2 opposite to air bearing surface ABS, and insulating layer 10 provided on both sides of stack 2 in track width direction T.

Stack 2 includes upper magnetic layer 8, lower magnetic layer 6, and non-magnetic intermediate layer 7 sandwiched between upper magnetic layer 8 and lower magnetic layer 6. Stack 2 has a stepped portion in non-magnetic intermediate layer 7 so that the track width of upper magnetic layer 8 is larger than that of lower magnetic layer 6. Accordingly, upper magnetic layer 8 has shape magnetic anisotropy, and the magnetization direction of upper magnetic layer 8 is made in a direction parallel to track width direction T. In such a manner, the desired magnetization state can be provided.

Further, the scope of the present invention includes the layer structure in which each of the magnetic layers is composed of two magnetic layers through the non-magnetic intermediate layer, respectively. Each of the upper and lower magnetic layers includes the first and second magnetic layers whose magnetization directions change corresponding to the external magnetic field, and the non-magnetic intermediate layer sandwiched between the first and second magnetic layers. Constructing a multilayer structure increases the number of interfaces and the resistivity changes. The magnetic field detecting element of the present embodiments can also be applied corresponding to requirement specifications of the magnetic head.

Figure 23:
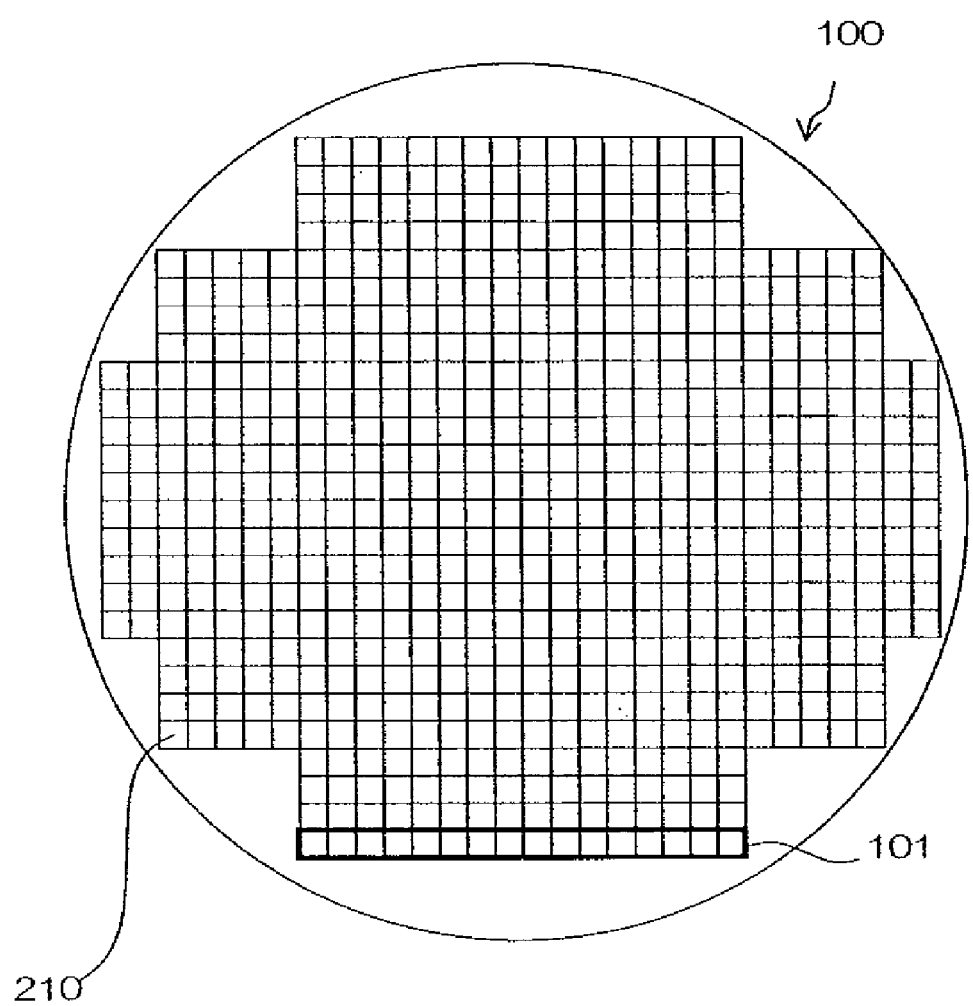
FIG. 23 is a plan view of a wafer which is used to manufacture a magnetic field detecting element of the present invention.

Next, explanation will be made regarding a wafer for fabricating a magnetic field detecting element described above. FIG. 23 is a schematic plan view of a wafer. Wafer 100 has a stack which is deposited thereon to form at least the magnetic field detecting element. Wafer 100 is diced into bars 101 which serve as working units in the process of forming air bearing surface ABS. After lapping, bar 101 is diced into sliders 210 which include thin-film magnetic heads. Dicing portions, not shown, are provided in wafer 100 in order to dice wafer 100 into bars 101 and into sliders 210.

Figure 24:
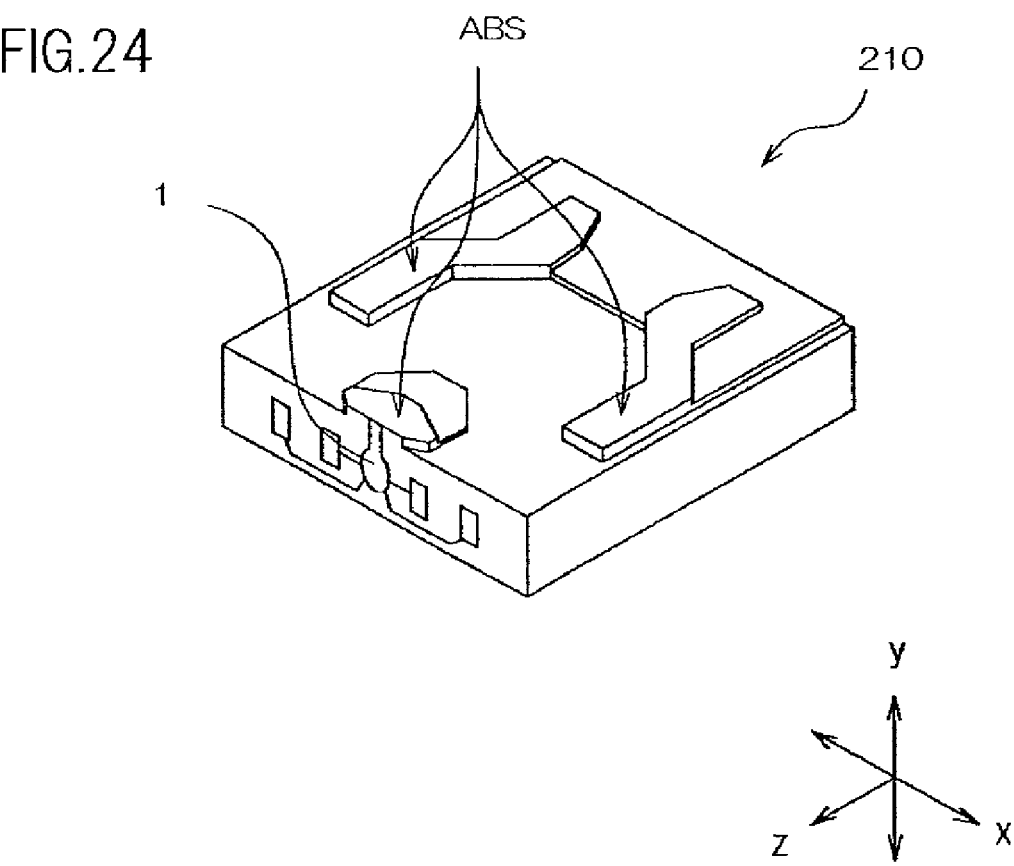
FIG. 24 is a perspective view of a slider of the present invention.

Referring to FIG. 24, slider 210 has a substantially hexahedral shape. One of the six surfaces of slider 210 forms air bearing surface ABS, which is positioned opposite to the hard disk.

Figure 25:
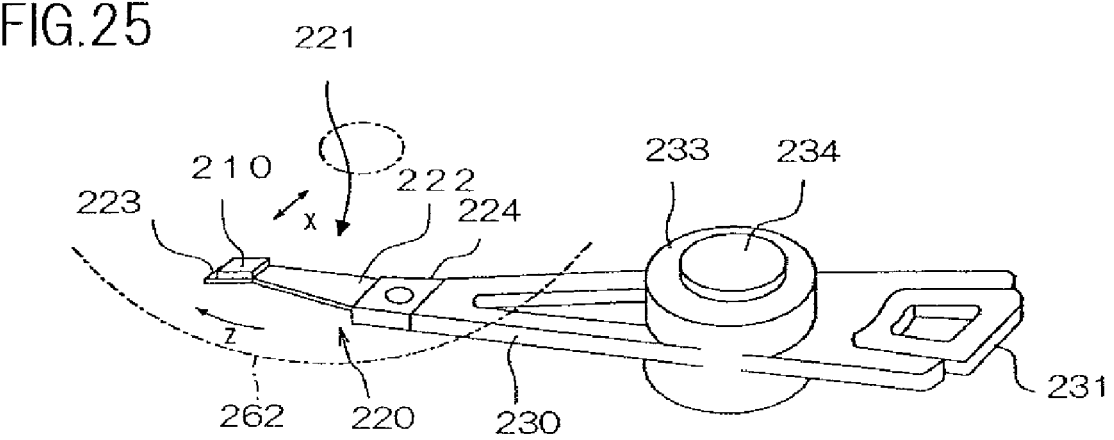
FIG. 25 is a perspective view of a head arm assembly including a head gimbal assembly in which the slider of the present invention is incorporated.

Referring to FIG. 25, head gimbal assembly 220 has slider 210 and suspension 221 for resiliently supporting slider 210. Suspension 221 has load beam 222 in the shape of a flat spring and made of, for example, stainless steel, flexure 223 that is attached to one end of load beam 222, and base plate 224 provided on the other end of load beam 222. Slider 210 is fixed to flexure 223 to provide slider 210 with an appropriate degree of freedom. The portion of flexure 223 to which slider 210 is attached has a gimbal section for maintaining slider 210 in a fixed orientation.

Slider 210 is arranged opposite to a hard disk, which is a rotationally-driven disc-shaped storage medium, in a hard disk drive as a magnetic recording device. When the hard disk rotates in the z direction shown in FIG. 25, airflow which passes between the hard disk and slider 210 creates a dynamic lift, which is applied to slider 210 downward in the y direction. Slider 210 is configured to lift up from the surface of the hard disk due to this dynamic lift effect. Magnetic field detecting element 1 is formed in proximity to the trailing edge (the end portion at the lower left in FIG. 24) of slider 210, which is on the outlet side of the airflow.

The arrangement in which head gimbal assembly 220 is attached to arm 230 is called head arm assembly 221. Arm 230 moves slider 210 in transverse direction x with regard to the track of hard disk 262. One end of arm 230 is attached to base plate 224. Coil 231, which constitutes a part of a voice coil motor, is attached to the other end of arm 230. Bearing section 233 is provided in the intermediate portion of arm 230. Arm 230 is rotatably held by shaft 234 which is attached to bearing section 233. Arm 230 and the voice coil motor to drive arm 230 constitute an actuator.

Figure 26:
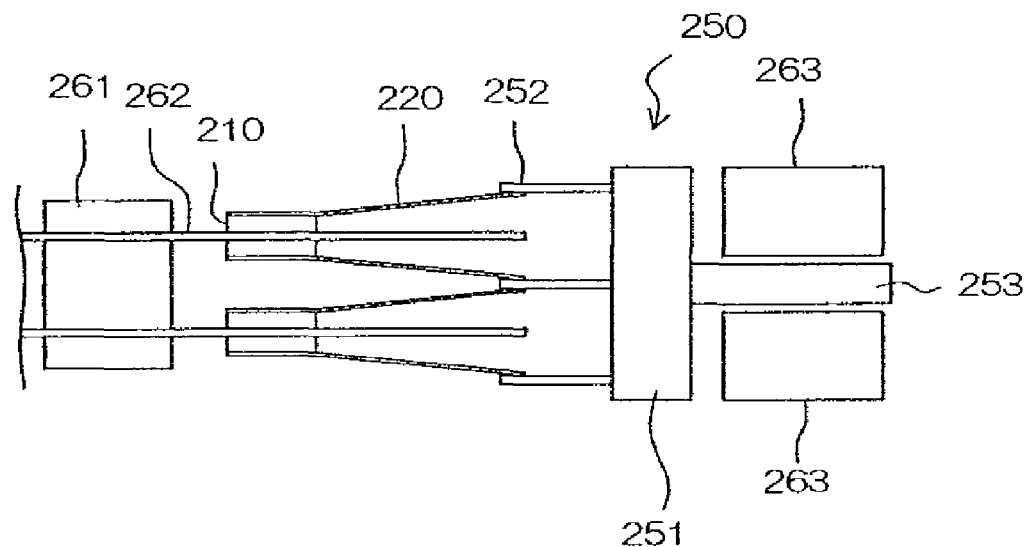
FIG. 26 is a side view of the head arm assembly in which the slider of the present invention is incorporated.
Figure 27:
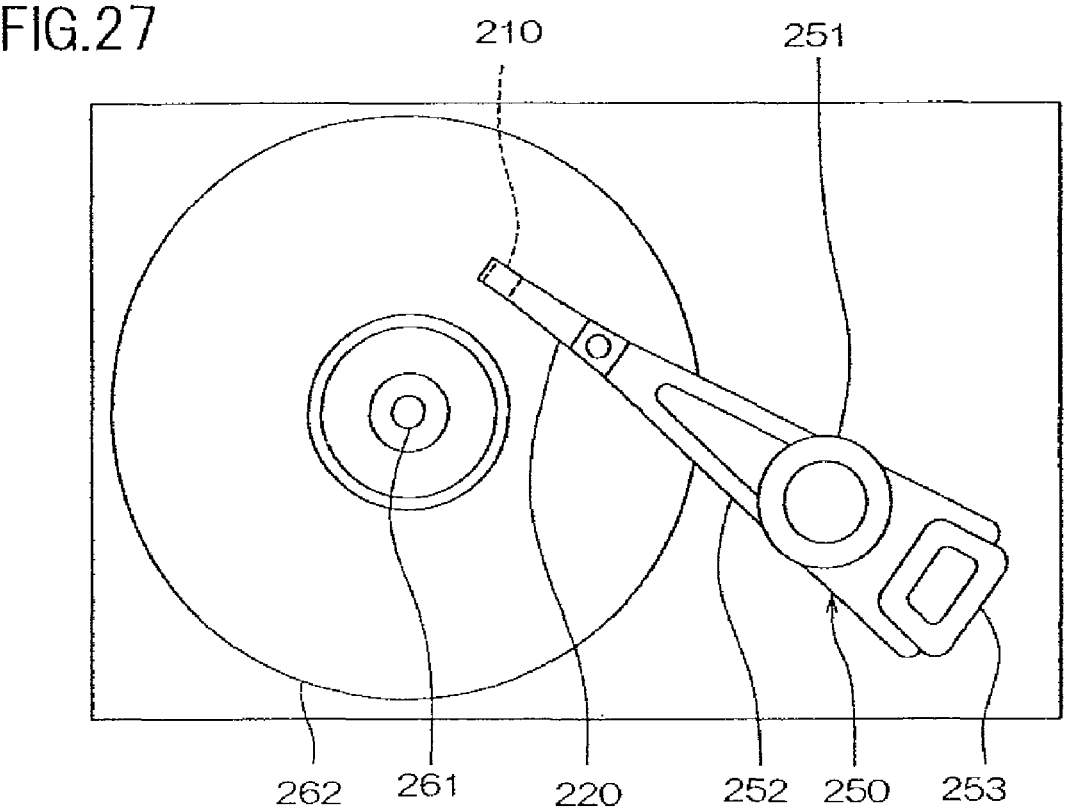
FIG. 27 is a plan view of a magnetic recording device in which the slider of the present invention is incorporated.

Referring to FIG. 26 and FIG. 27, a head stack assembly and a hard disk drive that incorporate the slider mentioned above will be explained next. The arrangement in which head gimbal assemblies 220 are attached to the respective arm of a carriage having a plurality of arms is called a head stack assembly. FIG. 26 is a side view of a head stack assembly, and FIG. 27 is a plan view of a hard disk drive. Head stack assembly 250 has carriage 251 provided with a plurality of arms 252. Head gimbal assemblies 220 are attached to arms 252 such that head gimbal assemblies 220 are arranged apart from each other in the vertical direction. Coil 253, which constitutes a part of the voice coil motor, is attached to carriage 251 on the side opposite to arms 252. The voice coil motor has permanent magnets 263 which are arranged in positions that are opposite to each other and interpose coil 253 therebetween.

Referring to FIG. 27, head stack assembly 250 is installed in a hard disk drive. The hard disk drive has a plurality of hard disks which are connected to spindle motor 261. Two sliders 210 are provided per each hard disk 262 at positions which are opposite to each other and interpose hard disk 262 therebetween. Head stack assembly 250 and the actuator, except for sliders 210, work as a positioning device in the present invention. They carry sliders 210 and work to position sliders 210 relative to hard disks 262. Sliders 210 are moved by the actuator in the transverse direction with regard to the tracks of hard disks 262, and positioned relative to hard disks 262. Magnetic field detecting element 1 that is included in slider 210 writes information to hard disk 262 by means of the write head portion, and reads information recorded in hard disk 262 by means of the read head portion.

Figure 28A:
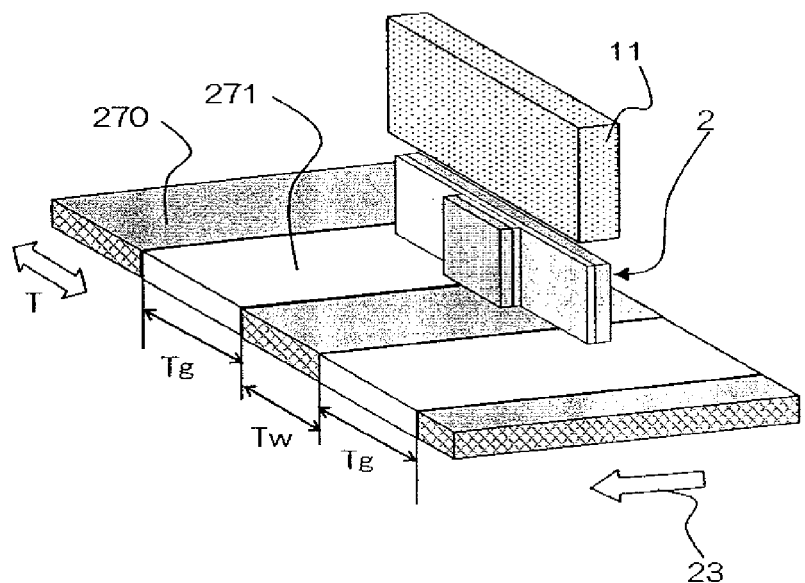
FIG. 28A is a conceptual perspective view of a discrete track medium that is a recording medium.
Figure 28B:
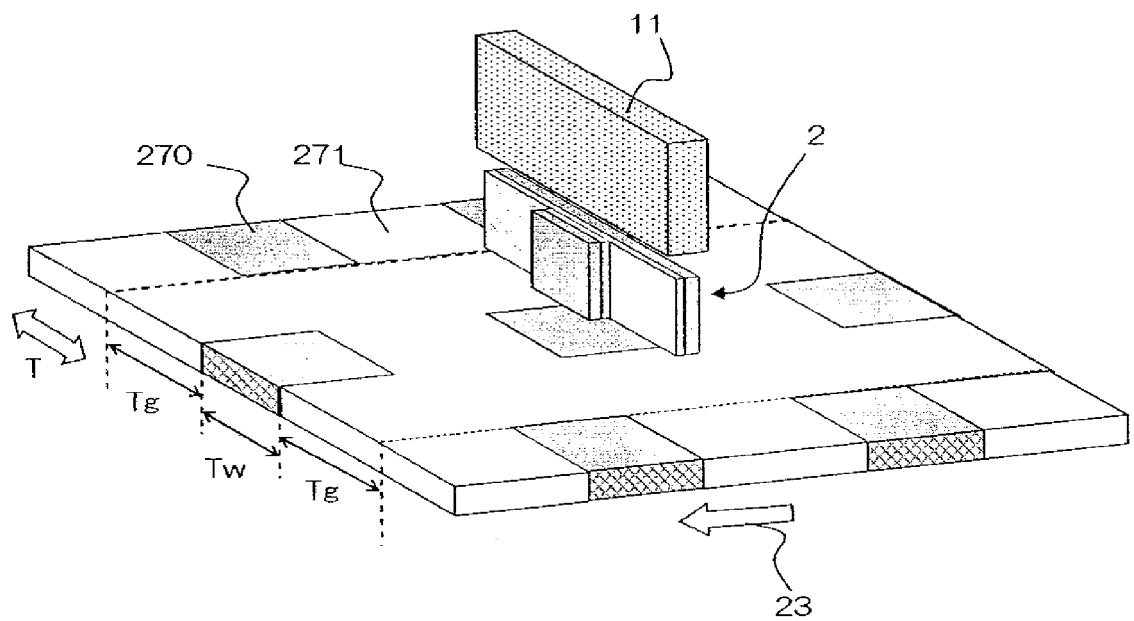
FIG. 28B is a conceptual perspective view of a patterned medium that is a recording medium.

As hard disk 262, a discrete medium may be desirably used. The discrete medium is a recording medium in which a recording area is divided into a plurality of areas. The discrete medium may include a discrete track medium in which recording area 270 is divided into a plurality of recording tracks as shown in FIG. 28A, and a patterned medium in which recording area 270 is divided into bits on a per-bit basis as shown in FIG. 28B. FIGS. 28A and 28B also show stack 2 in the magnetic field detecting element and bias magnetic layer 11 when the thin film magnetic head is on track. Non-recording area 271 of the discrete medium includes non-magnetic material, a groove and the like. The discrete medium can control magnetic interference (crosstalk) between adjacent recording areas 270, and can reduce noise even with a high recording density. Therefore, combined use of the discrete medium and magnetic field detecting element 1 of the present invention can provide a magnetic recording device that has a high recording density. In such a magnetic recording device, the track width of upper magnetic layer 8 and the track width of lower magnetic layer 6 that magnetic field detecting element 1 has have to be determined depending on recording track width Tw of the discrete medium and guard band width Tg (length of non-magnetic area 271 in track width direction T).

And now, the effect of track width X of upper magnetic layer 8 on output when magnetic information is reproduced will be described. For this purpose, a plurality of thin film magnetic heads including upper magnetic layers 8 having different track widths X was manufactured and measured as follows. First, a 3.5-inch discrete medium was rotated at 7200 rpm (7200 revolutions per minute) to record magnetic information on one track at a frequency of 10 MHz. Subsequently, the thin film magnetic head was positioned on the recorded track, and an average output was measured. This measurement was performed on a spin stand.

This measurement was performed based on the followings: recording track width Tw of the discrete medium was 70 nm; guard band width Tg was 70 nm; magnetic field detecting element 1 was formed in the same structure as that described in the second embodiment; height H of stack 2 was 70 nm; and track width Y of lower magnetic layer 6 was 200 nm.

Figure 29:
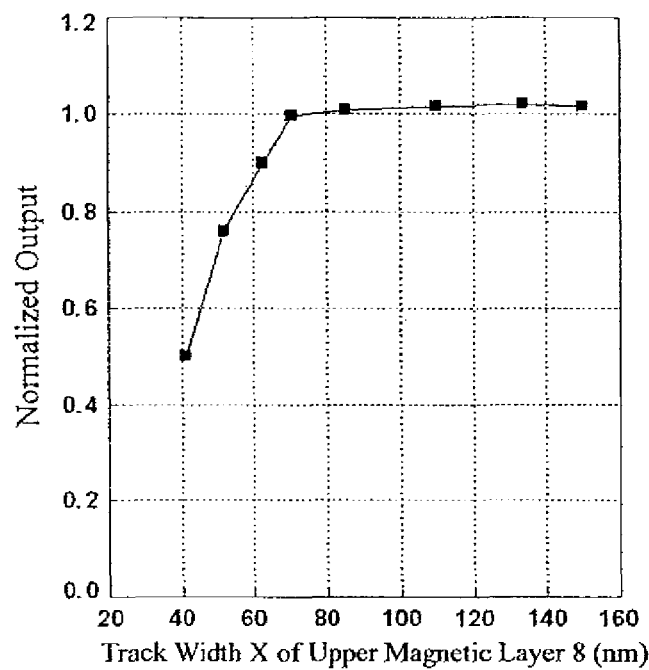
FIG. 29 is a graph showing the relationship between the length of an upper magnetic layer in the track width direction and an output.

FIG. 29 shows the relationship between the output obtained in such a way and track width X of upper magnetic layer 8. In FIG. 29, the output obtained when track width X of upper magnetic layer 8 was 70 nm is normalized to be 1.0. Where track width X of upper magnetic layer 8 is smaller than recording track width Tw (70 nm), track width X of upper magnetic layer 8 becomes smaller and the output largely decreases. Thus, it is difficult to detect magnetic information recorded on the discrete medium. On the one hand, where track width X of upper magnetic layer 8 is equal to or larger than 70 nm, the output takes an approximately constant value. That is, the thin film magnetic head can sufficiently detect magnetic information in the structure in which track width X of upper magnetic layer 8 is equal to or larger than recording track width Tw of the discrete medium.

Next, the effect of track width Y of lower magnetic layer 6 on output will be described. For this purpose, a plurality of thin film magnetic heads including lower magnetic layers 6 having different track widths Y was manufactured and measured as follows. First, a 3.5-inch discrete medium was rotated at 7200 rpm (7200 revolutions per minute) to record magnetic information on one track at a frequency of 10 MHz. Subsequently, the thin film magnetic head was positioned at a track (track in which magnetic information not recorded) adjacent to the recorded track, and an output was measured. In such a manner, a signal-to-noise (S/N) ratio was measured relative to an output derived from magnetic information of the adjacent track, where a signal was defined as an integral value of the output in the vicinity of 10 MHz, and a noise was defined as an integral value of the output in the band from 1 MHz to 100 MHz excluding the vicinity of 10 MHz. Because the signal was the output derived from magnetic information of an adjacent track, the more the S/N ratio increases, the more the magnetic information of the adjacent track is detected by the thin film magnetic head. Therefore, it should be noted that the smaller that the S/N ratio becomes, the higher is the reproduction performance of the thin film magnetic head. This measurement was performed on a spin stand.

Recording track width Tw of the discrete medium used for this measurement was 50 nm, and guard band width Tg was 50 nm. Height H of stack 2 of magnetic field detecting element 1 was 70 nm, and track width X of upper magnetic layer 8 was 70 nm.

Figure 30:
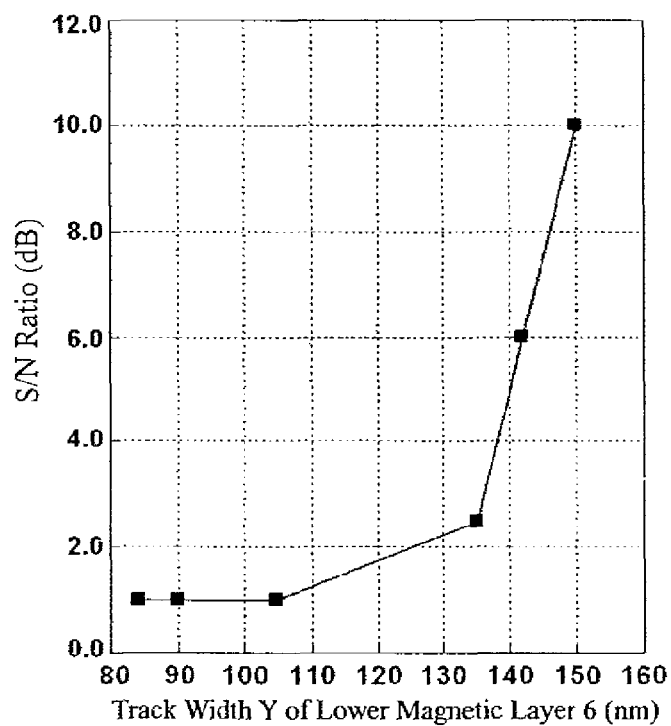
FIG. 30 is a graph showing the relationship between the length of the upper magnetic layer in the track width direction and a signal-to-noise (S/N) ratio in an output due to magnetic information of an adjacent track.

FIG. 30 shows the S/N ratio concerning the output derived from the magnetic information of an adjacent track. Where track width Y of lower magnetic layer 6 is equal to or smaller than 105 nm ($0.7 \times (Tw+2 \times Tg)$), the S/N ratio becomes smaller and the influence of the magnetic information of the adjacent track is small enough so that it can be disregarded. However, where track width Y is larger than 105 nm, the S/N ratio monotonously increases as the track width Y of lower magnetic layer 6 increases. Especially in a region where track width Y is larger than 135 nm ($0.9 \times (Tw+2 \times Tg)$), the S/N ratio rapidly increases. The reason for this is thought to be because both end portions of lower magnetic layer 6 in the track width direction come closer to an adjacent track. Therefore, track width Y of lower magnetic layer 6 may be preferably $Y \leq (0.9 \times (Tw+2 \times Tg))$. Further, track width Y may be more preferably $Y \leq (0.7 \times (Tw+2 \times Tg))$.

Although certain preferred embodiments of the present invention have been shown and described in detail, it should be understood that various changes and modifications may be made without departing from the spirit or scope of the appended claims.

The invention claimed is:

1. A magnetic field detecting element comprising:
   a stack including an upper magnetic layer and a lower magnetic layer, and a non-magnetic intermediate layer sandwiched between said upper magnetic layer and said lower magnetic layer, wherein magnetization of said upper magnetic layer and said lower magnetic layer change in accordance with an external magnetic field;
   an upper shield electrode layer and a lower shield electrode layer which is provided to sandwich said stack therebetween in a direction of the stacking of said stack, wherein said upper shield electrode layer and said lower shield electrode layer supply sense current in the direction of stacking, and magnetically shield said stack;

a bias magnetic layer which is provided on a surface of said stack opposite to an air bearing surface, and wherein said bias magnetic layer applies a bias magnetic field to said upper magnetic layer and said lower magnetic layer in a direction perpendicular to the air bearing surface; and insulating layers which are provided on both sides of said stack in a track width direction thereof, wherein said stack has a stepped portion formed at said non-magnetic intermediate layer so that a length of said upper magnetic layer in the track width direction is different from that of said lower magnetic layer.

2. The magnetic field detecting element according to claim 1, wherein $Y/X \geq 1.2$ is satisfied, wherein, regarding the length of said upper magnetic layer in the track width direction and the length of said lower magnetic layer in the track width direction, X is the smaller length, and Y is the larger length.

3. The magnetic field detecting element according to claim 1, wherein $Y/X \geq 1.5$ is satisfied, wherein, regarding the length of said upper magnetic layer in the track width direction and the length of said lower magnetic layer in the track width direction, X is the smaller length, and Y is the larger length.

4. The magnetic field detecting element according to claim 1, wherein a magnetization direction of said upper magnetic layer and a magnetization direction of said lower magnetic layer are approximately perpendicular to each other and form an angle of 45° relative to the direction perpendicular to the air bearing surface, respectively when no external magnetic field is applied.

5. The magnetic field detecting element according to claim 1, wherein one of said upper shield electrode layer and said lower shield electrode layer is constructed on both sides of said stack in the track width direction through the insulating layers.

6. A slider including the magnetic field detecting element according to claim 1.

7. A wafer including the magnetic field detecting element according to claim 1.

8. A head gimbal assembly including the slider according to claim 6, and a suspension for resiliently supporting the slider.

9. A magnetic recording device including the slider according to claim 6, and a device for supporting the slider and positioning the slider with respect to a recording medium.

10. The magnetic recording device according to claim 9, wherein the recording medium is a discrete medium, and $X \geq Tw$ is satisfied, wherein Tw is a recording track width of the discrete medium, and regarding the length of said upper magnetic layer in the track width direction and the length of said lower magnetic layer in the track width direction, X is the smaller length.

11. The magnetic recording device according to claim 9, wherein the recording medium is a discrete medium, and $Y \leq 0.9 \times (Tw + 2 \times Tg)$ is satisfied, wherein Tw is a recording track width of the discrete medium, Tg is a guard band width, and regarding the length of said upper magnetic layer in the track width direction and the length of said lower magnetic layer in the track width direction, Y is the larger length.

12. The magnetic recording device according to claim 9, wherein the recording medium is a discrete medium, and $Y \leq 0.7 \times (Tw + 2 \times Tg)$ is satisfied, wherein Tw is a recording track width of the discrete medium, Tg is a guard band width, and regarding the length of said upper magnetic layer in the track width direction and the length of said lower magnetic layer in the track width direction, Y is the larger length.

* * * * *